US009025353B2

(12) United States Patent
Birnbach

(10) Patent No.: US 9,025,353 B2
(45) Date of Patent: May 5, 2015

(54) HIGH VOLTAGE HIGH CURRENT REGULATOR

(75) Inventor: Curtis A. Birnbach, New Rochelle, NY (US)

(73) Assignee: Advanced Fusion Systems LLC, Newtown, CT (US)

(*) Notice: Subject to any disclaimer, the term of this patent is extended or adjusted under 35 U.S.C. 154(b) by 692 days.

(21) Appl. No.: 13/253,877

(22) Filed: Oct. 5, 2011

(65) Prior Publication Data

US 2012/0081097 A1    Apr. 5, 2012

Related U.S. Application Data

(60) Provisional application No. 61/390,031, filed on Oct. 5, 2010, provisional application No. 61/406,792, filed on Oct. 26, 2010.

(51) Int. Cl.
*H02M 5/22* (2006.01)
*G05F 1/10* (2006.01)

(52) U.S. Cl.
CPC ........................................ *G05F 1/10* (2013.01)

(58) Field of Classification Search
USPC ............... 363/23, 29, 31, 35, 38, 71, 99, 111, 363/120, 121, 122; 323/237, 254, 257, 263, 323/265, 267, 268, 271, 291
See application file for complete search history.

(56) References Cited

U.S. PATENT DOCUMENTS

| | | | |
|---|---|---|---|
| 3,753,168 A | 8/1973 | Schor | |
| 4,950,962 A | 8/1990 | Birnbach et al. | |
| 4,979,076 A | 12/1990 | DiBugnara | |
| 5,422,599 A * | 6/1995 | Larsen | 330/196 |
| 6,429,044 B1 | 8/2002 | Tuttle | |
| 2004/0079391 A1 | 4/2004 | Gindel | |
| 2006/0018085 A1 | 1/2006 | Kelly | |
| 2006/0044847 A1 | 3/2006 | Baumgart et al. | |
| 2008/0048626 A1 | 2/2008 | Kimura | |

(Continued)

FOREIGN PATENT DOCUMENTS

| | | |
|---|---|---|
| GB | 1173739 | 12/1969 |
| GB | 1255109 | 11/1971 |
| GB | 1392262 | 4/1975 |

(Continued)

*Primary Examiner* — Harry Behm
*Assistant Examiner* — Afework Demisse
(74) *Attorney, Agent, or Firm* — Bruzga & Associates; Charles E. Bruzga; Jay S. Pattumudi

(57) ABSTRACT

High voltage high current regulator circuit for regulating current is interposed between first and second terminals connected to an external circuit and comprises at least one main-current carrying cold-cathode field emission electron tube conducting current between the first and second terminals. First and second grid-control cold-cathode field emission electron tubes provide control signals for first and second grids of the at least one main-current carrying cold-cathode field emission electron tube for positive and negative excursions of voltage on the first and second terminals, respectively. The current regulator circuit may be accompanied by a voltage-clamping circuit that includes at least one cold-cathode field emission electron tube. At least two cold-cathode field emission electron tubes, configured to operate at high voltage and high current, are preferably contained within a single vacuum enclosure and are interconnected to provide a circuit function, so as to form a high voltage high current vacuum integrated circuit.

15 Claims, 12 Drawing Sheets

(56) References Cited

U.S. PATENT DOCUMENTS

| | | |
|---|---|---|
| 2008/0247105 A1 | 10/2008 | Divan |
| 2009/0190383 A1 | 7/2009 | Birnbach |
| 2009/0285362 A1 | 11/2009 | Birnbach |
| 2010/0097734 A1 | 4/2010 | Birnbach |
| 2010/0195256 A1 | 8/2010 | Birnbach |
| 2010/0195266 A1 | 8/2010 | Morita et al. |
| 2010/0289577 A1 | 11/2010 | Birnbach |

FOREIGN PATENT DOCUMENTS

| | | |
|---|---|---|
| JP | 06-260870 | 9/1994 |
| WO | 2010047890 A2 | 4/2010 |
| WO | 2010047890 A4 | 10/2010 |
| WO | 2011028300 A1 | 3/2011 |

* cited by examiner

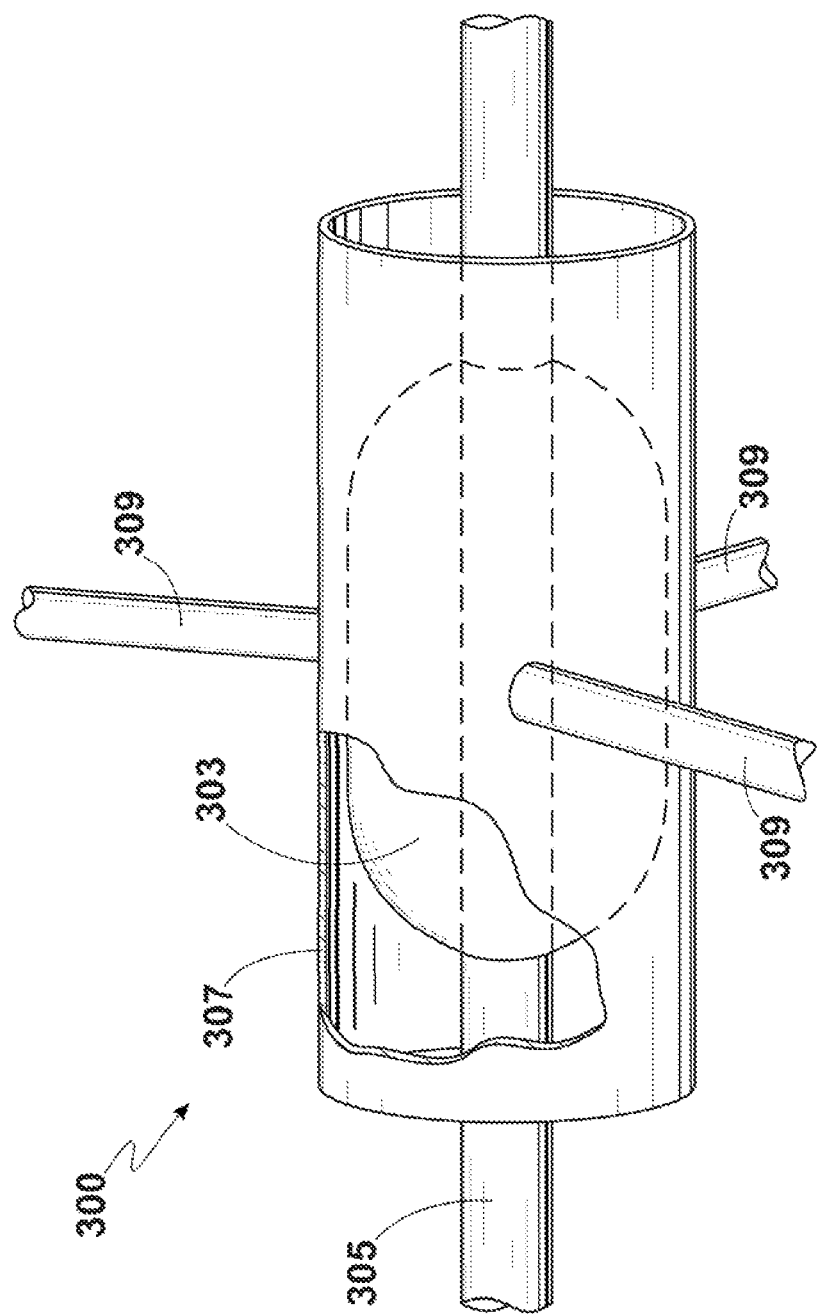

HIGH VOLTAGE HIGH CURRENT REGULATOR

FIELD OF THE INVENTION

The present invention relates to a high voltage, high current regulator circuit, with one aspect relating to controlling high current in a circuit, another aspect relating to clamping a high voltage in a circuit, and yet another aspect relating to a vacuum integrated circuit.

CROSS-REFERENCE TO RELATED APPLICATIONS

This application is related to two prior applications by the current inventor, U.S. application Ser. No. 12/359,198, filed 23 Jan. 2009, entitled High Voltage Inverter; and U.S. application Ser. No. 12/554,818, filed 4 Sep. 2009, entitled Method and Apparatus For Protecting Power Systems From Extraordinary Electromagnetic Pulses.

BACKGROUND OF THE INVENTION

There is a need for reliable and efficient current regulators, as well as voltage-clamping circuits, for high voltage high power circuits. There are numerous applications for such technology, ranging from critical control functions in the electrical power grid to medical diagnostic and therapeutic systems and military weapons. An "electrical power grid" as used herein means an electrical power and distribution grid for powering private residences, industry and government users.

Current Regulation of Electrical Power Grids

With regard to large-scale electrical power grids operating at high voltage and high current, one of the most significant problems is that of limiting fault current. There is a compelling need to modernize the electrical power grid of the USA and other countries, with a growing need for effective fault current regulators on the electrical power grid. A typical current practice is for electrical transmission systems to be sized at a substantial multiple of the actual load capacity in order to withstand transient fault current conditions which would otherwise destabilize the grid. This creates a cost overhead factor that can be on the order of 75% above what would be needed if the grid was designed only for the actual load capacity. Thus, reduction of fault current transients could dramatically increase the effective capacity of the grid. In addition, there are other current-regulation applications in electrical power grid operation that could benefit from an effective fault current regulator, such as power flow regulation.

Prior art current fault limiters are typically based on technologies such as insertion of resistance or inductance, which may be conventional or superconducting inductance coils, or the use of solid state devices, such as metal oxide varistors. None of these techniques is capable of meeting the needs of the electric power industry. Currently, the most robust systems under development offer fault current limiting of approximately 50% of maximum rated current, while the electric power industry needs limiting of 80% or more of maximum rated current. Further, prior art technologies are limited in voltage- and current-handling capacity due to the intrinsic nature of their design.

Purely resistive current limiting is the oldest and the least efficient method of limiting current. It involves inserting into a current-carrying conductor a series resistance whose value has been calculated to only allow a certain maximum amount of current to flow. Excess current is converted directly to heat, so that efficiency is very low. Resistive current limiting is rarely used in power circuitry since the efficiency is frequently only on the order of 50%.

Conventional inductive current limiting is somewhat better than resistive current limiting and is, in fact, widely used in the electric power industry. A disadvantage of inductive current limiting is that current is shifted out of phase with the voltage, resulting in a poor power factor. In more expensive inductive current limiting reactors, a capacitor is often paired with an inductor to correct the power factor. This becomes problematic on high power systems, since the power handling and voltage-withstand ratings of inductors and capacitors are limited. It is principally this limitation that has driven the present development efforts in the power industry for more reliable and effective current limiting techniques.

The use of superconducting technology has been proposed and prototypes have been built for fault currant limiting in electrical power grids. However, the reliability of superconducting technology is hampered by the need for complex cryogenic refrigeration systems to maintain the superconducting elements at or below their critical temperature. Should the cryogenic systems fail, the superconducting devices lose superconductivity and go "normal" so as to become resistances in the power lines. Aside from an unreliable system design due to complex mechanical components, the cost of limiters based on this technology is high, and they presently are limited to about 138 KV maximum. To make the grid robust, limiters are needed that can operate at about 500 KV and above. At low voltages, typically between 4 KV and 35 KV, both size and cost precludes the use of superconductive current regulators In the case of solid state techniques for current limiting, the same drawbacks that characterize other solid state power electronics systems apply. There is no single solid state device that can handle either the necessary voltage or current, thus forcing designers to connect multiple devices in both series and parallel to increase voltage and current handling capacities, respectively. However, placing devices in series and parallel requires "balancing networks" to ensure that the voltage and current are evenly distributed across an array of devices. This adds to the complexity and cost of a system and reduces its reliability. Solid state devices are also subject to single-arc failures. A single-arc failure is caused when an individual device suffers an electrical breakdown and an arc occurs within the crystal of the semiconductor itself. This damages the crystal, frequently leaves a carbon track, and causes the semiconductor device to stop working.

The foregoing discussion demonstrates several reasons why the existing technologies are not satisfactory for use in current regulation (e.g., current limiting) in high power electric power grids. Accordingly, there is a need for a reliable and effective fault current regulator that can be used in electrical power grids or other circuits.

Voltage Regulation of Electrical Power Grids

An additional concern regarding electrical power grids are transient voltages, which can be destructive to electrical components in the grid. Transient voltages may arise from various causes, and virtually always arise in the present of a substantial fault current.

Thus, a need exists for a robust voltage regulator, e.g., a voltage-clamping circuit that can operate at high voltage and high current in an electrical power grid or other circuit.

BRIEF SUMMARY OF THE INVENTION

In a preferred embodiment, a high voltage high current regulator circuit for being interposed between first and second terminals that are connected to an external circuit comprises a bidirectional current-regulating circuit connected between the first and second terminals for receiving and regulating current between the first and second terminals. The current-regulating circuit comprises at least one main-current carrying cold-cathode field emission electron tube that conducts current between the first and second terminals. The at least one main-current carrying cold-cathode field emission electron tube has first and second control grids for controlling current conduction between the first and second terminals when the voltage on the first and second terminals is positive and negative, respectively. First and second grid-control cold-cathode field emission electron tubes respectively provide control signals for the first and second grids.

Beneficially, the foregoing current regulator provides a reliable and effective fault current regulator that can be used in electrical power grids, as well as providing other functions such as described below.

In accordance with another aspect of the invention, a voltage-clamping circuit, which may be used independently or used in conjunction with the foregoing current regulator, is interposed between first and second terminals that are connected to an external circuit. The voltage-clamping circuit comprises a bidirectional voltage clamp including at least one cold-cathode field emission electron tube. The bidirectional voltage clamp has a threshold operating voltage. First and second control grids are associated with the at least one cold-cathode field emission electron tube and are receptive of respective control signals for modulating voltage in a main current-conducting path between the first and second terminals. A circuit biases the voltage clamp via the first and second control grids to set the threshold operating voltage.

Beneficially, the foregoing voltage-clamping circuit can operate at high voltage and high current in an electrical power grid or other circuits.

A preferred embodiment of the present invention uses the foregoing current regulator and voltage clamp in conjunction with each other. It is distinguished from solid-state devices by its extreme resistance to failures due to arcing. In a solid-state device, a single electrical arc will cause a catastrophic failure, while, in mentioned embodiment, the circuit can be made to be highly tolerant to arcing using routine skill in the art based on the present specification.

The present embodiment is further distinguished over a solid-state version because it has a substantially broader temperature operating range. In solid state devices, performance starts to rapidly decline typically at only about 26 degrees C., as opposed to the mentioned embodiment when using cold-cathode field emission electron tubes, which can successfully operate at temperatures of 650 degrees C. without the use of specially made cooling means. The upper temperature limit for cold-cathode field emission electron tubes occurs at around 760 degrees C., at which point the tube electrodes go in spontaneous thermionic emission and the tube begins to continuously conduct current. Some new semiconductor devices, usually based on silicon carbide, can operate at somewhat higher temperatures than silicon-based devices, that is, about 200 degrees C. maximum. While this is a substantial improvement, it is still substantially lower than the temperature limit for cold-cathode field emission electron tubes, and silicon carbide is still subject to single arc failures, making it almost as vulnerable as silicon-based devices. Silicon carbide is also very expensive and has low individual device voltage and current handling ratings, typically having a voltage rating no higher than about 1500 volts, necessitating the extensive use of series and parallel networks to achieve higher voltage ratings.

In the mentioned embodiment of the invention, combining a current regulator and a voltage clamp, a single cold-cathode field emission electron tube can be built to handle voltages in excess of one million volts, with current handling capacities measured in hundreds of KiloAmperes, which no known semiconductor device can achieve.

A high voltage high current vacuum integrated circuit comprises a common vacuum enclosure. The vacuum enclosure contains (1) at least one internal vacuum pumping means; (2) at least one exhaust tubulation for evacuating the vacuum enclosure and subsequently sealing and separating the vacuum enclosure from at least one external vacuum pump; (3) vacuum-sealed electrically-insulated feedthroughs passing electrical conductors from outside the vacuum enclosure to inside the enclosure while electrically insulating the electrical conductors from the vacuum enclosure and maintaining the vacuum seal; and (4) internal electrical insulation for minimizing the overall size requirement for the vacuum enclosure, and preventing internal electrical short circuits. At least two cold-cathode field emission electron tubes within the vacuum enclosure are configured to operate at high voltage and high current and are interconnected with each other to implement a circuit function.

The foregoing high voltage high current vacuum integrated circuit increases system reliability and simplifies installation into a system as compared to the prior art practice of housing of each cold-cathode field emission electron tube in a separate vacuum housing.

BRIEF DESCRIPTION OF THE DRAWINGS

Further features and advantages of the invention will become apparent when reading the following detailed description of the invention in conjunction with the drawing figures, in which:

FIG. 12 is a perspective view, partially cutaway, of a ferrite low pass filter having an integrated capacitor that may be used in the high voltage high current vacuum integrated circuit of FIG. 8.

DETAILED DESCRIPTION OF THE INVENTION

Figure 1:
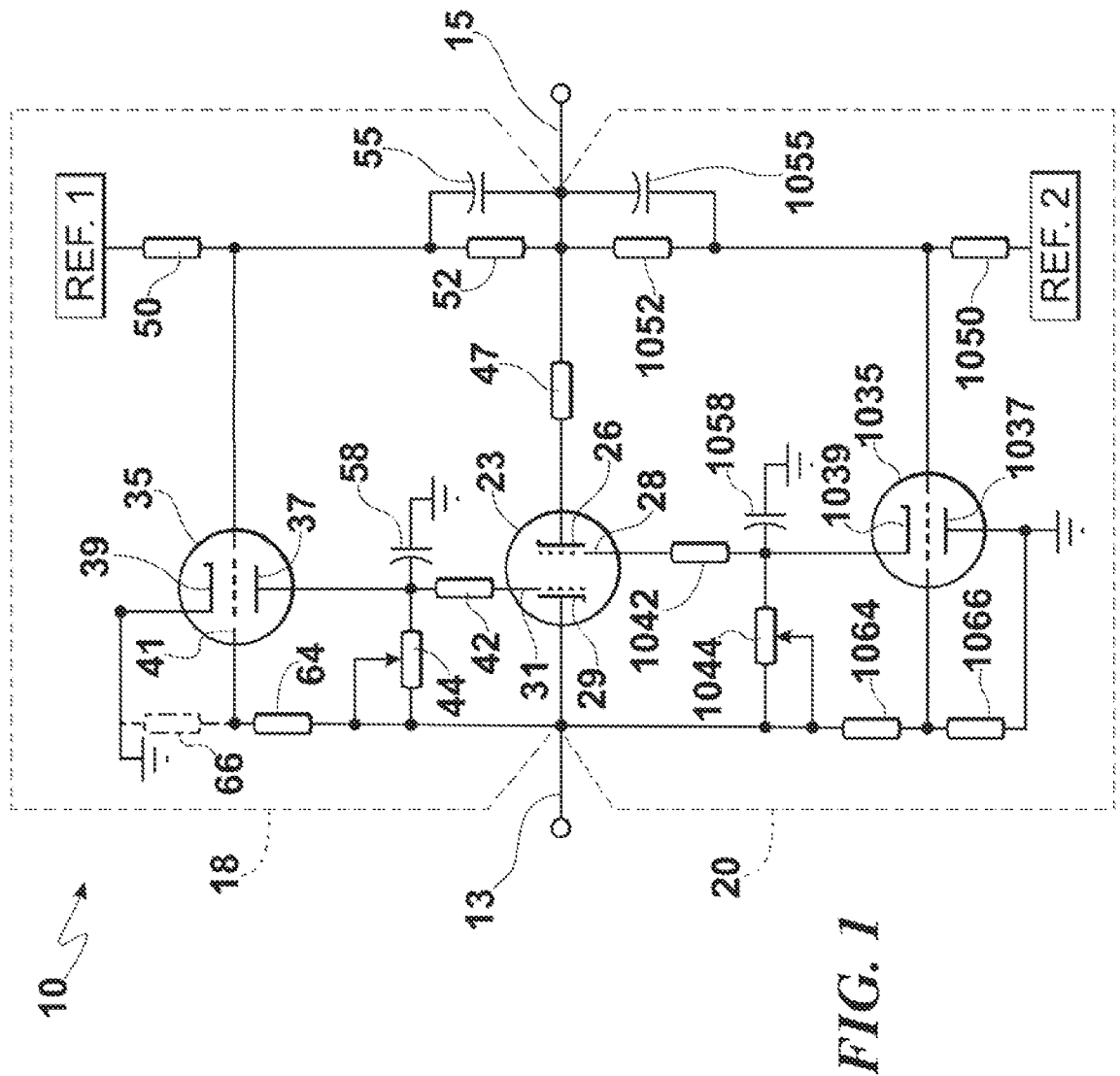
FIG. 1 is an electrical schematic diagram of a high voltage high current regulator, partly in block form, in accordance with a preferred embodiment of the invention.

A list of reference numerals and associated parts appears near the end of this detailed description.

The following definitions relate to terms that used herein.

Definitions

"Electrical power grid" means herein an electrical power and distribution grid for powering private residences, industry and government users. Typically, an electrical power grid will have a plurality of power generators and a means for transmission of electricity to a plurality of distribution substations, the function of which substations is to distribute power to private residences, industry and government users.

"Fault current" means a severe over-current condition.

"High current" means herein greater than 50 Amps.

"High voltage" means herein greater than 400 Volts AC.

High Voltage Current Regulator

In accordance with a first aspect of the invention, FIG. 1 shows a high voltage current regulator circuit 10 having first and second terminals 13 and 15 for being interposed in an circuit whose current is to desired to be regulated. Preferably, current regulator circuit 10 has a high current capacity, where "high current" is defined above. When the polarity of a voltage on the first and second terminals 13 and 15 is positive, the portion of the circuit 10 almost fully bounded by dashed-line loop 18 controls the operation of the regulator circuit 10. Conversely, when the polarity of a voltage at the first and second terminals 13 and 15 is negative, the portion of the circuit 10 almost fully bounded by dashed-line loop 20 controls the operation of the regulator circuit 10. Of course, in the horizontally illustrated circuit path between the first and second terminals 13 and 15, the conductor (unnumbered), the main current-carrying electrodes (called cathanodes) 28 and 29 of the Bi-tron tube 23 and a shunt resistor 47 are used for both positive and negative voltage excursions on the first and second terminals 13 and 15. The grids 26 and 31 of Bi-iron 23 are respectively used during the positive and negative excursions of voltage on first and second terminals 13 and 15.

The dashed-line loops 18 and 20 preferably are symmetrically arranged with each other, both as to circuit topology and component values, so that a description of only the circuitry associated with dashed-line loop 18 suffices to describe the circuitry associated with dashed-line loop 20.

Figure 2:
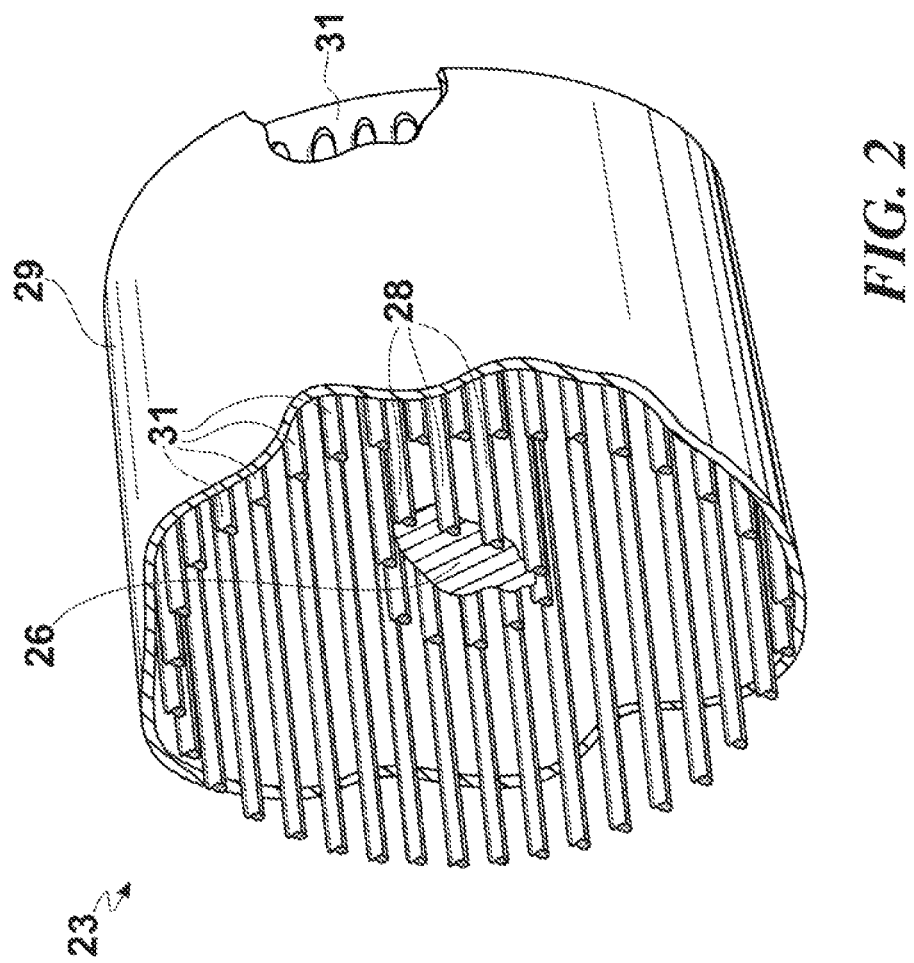
FIG. 2 is a simplified perspective view, partially cut away, of a bidirectional cold-cathode field emission tetrode tube, or Bi-tron tube, that may be used in the current regulator of FIG. 1.

The circuitry of dashed-line loop 18 includes a bidirectional cold-cathode field emission tube 23, referred to in abbreviated form herein as a Bi-tron tube. The structure of the Bi-tron tube 23 may be more readily appreciated with reference to FIG. 2, which shares common part numbers with the Bi-tron 23 if FIG. 1. As shown in FIG. 2, Bi-Von tube 23 includes an inner "cathanode" 26, by which is meant a main current-carrying conductor that alternately functions as a cathode and an anode. Cathanode 26 is cylindrically shaped, and may be in the form of a cylindrical solid as shown. A second cathanode 29, of cylindrical shape, surrounds cathanode 26 and shares the same longitudinal axis (not shown). A cylindrically shaped grid 28 surrounds cathanode 26, is adjacent to, and associated with, such cathanode. A cylindrically shaped grid 31 is enclosed by cathanode 29 and is adjacent to, and associated with, such cathanode. Further details of Bi-tron tubes can be found in Pub. No. US2010/0195256 A1 dated Aug. 5, 2010, entitled "Method and Apparatus for Protecting Power Systems from Extraordinary Electromagnetic Pulses," now U.S. Pat. No. 8,300,378 B2.

A high voltage electron tube 35 is included in dashed-line loop 18, and, in accordance with circuitry to be now described, senses voltage on first terminal 13 and controls grid 31 of Bi-tron 23. High voltage electron tube 35, also known as a Pulsatron tube, is a cold-cathode field emission tube, having an anode 37, a cathode 39 and a grid 41 adjacent to, and associated with such cathode 39. In an actual embodiment, anode 37, cathode 39 and grid 41 are cylindrically shaped. Further details of a Pulsatron tube are found in U.S. Pat. No. 4,950,962, issued Aug. 21, 1990, entitled High Voltage Switch Tube. First terminal 13 and second terminal 15 are preferably interconnected into an electrical power grid (not shown) in the order of direction of power flow in the electrical power grid.

In the dashed-line loop 18 of FIG. 1, assuming a positive voltage on first and second terminals 13 and 15, resistor 42 and an adjustable resistor 44 establish a bias voltage for grid 31 of Bi-tron 23, which functions as a series current regulator. Resistor 42 may have an inductive component as well. Bi-tron 23 is functionally analogous to a FET in this circuit. The current flowing from Bi-tron tube 23 flows through a shunt resistor 47 so as to develop a voltage across such resistor 47. This voltage is fed through a voltage divider comprised of resistors 50 and 52. Grid 41 of Pulsatron tube 35 is connected to the junction of resistors 50 and 52. A reference voltage, marked, REF. 1, is applied to the upper side of resistor 50. The ratio between the voltage of shunt resistor 47, taken at second terminal 15, and the reference voltage REF. 1 determines the degree of conduction of Pulsatron tube 35, which, in turn, controls the conduction of Bi-tron tube 23. A capacitor 55, connected across resistor 52, establishes a first time constant with resistor 50 to ensure that the circuit stays in conduction up to the zero-crossing point. By adjusting the values of reference voltage REF. 1 and the resistor values of voltage divider 50 and 52, different current-regulation modes can be implemented. Reference voltage REF. 1 is provided by another circuit, and will be routine to implement by a person of ordinary skill.

Suppression of Harmonics

High frequency harmonics are undesirable in electric power grids where they lead to system inefficiencies. Considerable effort is expended by the public utility companies to eliminate high frequency harmonics, so any switching component that produces them is of inappropriate design for power grid applications. Reduction of harmonic content in switching operations by high voltage current regulator 10 (FIG. 1) is preferably implemented (1) by increasing the length of the electron gun assemblies formed from cathanodes 26 and 29 as shown in FIG. 2, and (2) by including a second time constant circuit in each dashed-line loop 18 or 20 in FIG. 1 for controlling Bi-tron 23.

Thus, the circuitry within dashed-line loop 18 includes an RC time constant circuit, formed by resistor 42 and capacitor 58, which has been calculated to produce a risetime on the order of ⅛ of a cycle in a 60 Hz or other typical frequency in an electrical power distribution grid circuit. An alternative time constant circuit uses an inductor in place of resistor 42, in series with grid 29 of Bi-tron tube 23. The described time resistor-capacitor (RC) time constant circuit or inductor capacitor (LC) time constant circuit provides the desired slow rise time to minimize harmonics, as described above.

Resistor 64 is part of an adjustable voltage divider with adjustable resistor 44, for setting the grid bias of Pulsatron 35. Resistor 64 also influences the bias of the associated grid 31 of the Bi-tron tube 23. A further resistor 66, shown in phantom lines, may also be used in biasing grid 41 of Pulsatron tube 35.

Figure 3:
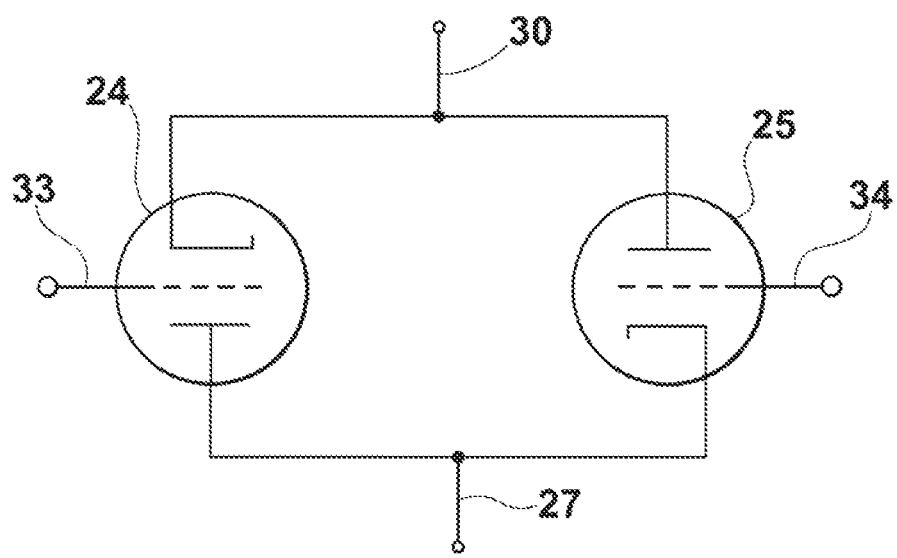
FIG. 3 is an electrical schematic diagram of a pair of back-to-back cold-cathode field emission tubes that may be used instead of a Bi-tron tube shown in FIGS. 1 and 2.

FIG. 3 shows an alternative to using a bidirectional cold-cathode field emission tube, or Bi-tron tube, 23 in FIG. 1. Thus, FIG. 3 shows a pair of back-to-back, or anti-parallel, connected cold-cathode field emission electron tubes 24 and 25, so that the anode of tube 24 is at the potential of main-current carrying electrode 27, which corresponds to cathanode 26 of Bi-tron 23 (FIG. 1) and the anode of tube 25 is at the potential of main current-carrying electrode 30, which corresponds to cathanode 29 of Bi-tron 23. Tubes 24 and 25 have respective control grids 33 and 34, which correspond to control grids 31 and 28 of Bi-tron 23 in FIG. 1. Electron tubes 24 and 25 preferably have cylindrical electrode geometry, and may comprise Pulsatron tubes, described above.

For operation of high voltage current regulator circuit 10 when the polarity of the voltage on first and second terminals 13 and 15 is negative, the circuitry within dashed-line loop 20 functions in a complementary manner to the above-described circuitry in dashed-line loop 18. Corresponding components in dashed-line loop 20 have been given corresponding reference numerals, augmented by a leading "10"; whereby, Pulsatron tube 1135 in lower loop 20 corresponds to Pulsatron tube 35 in upper loop 18.

Preferred Design Features of Current-Regulating Circuit

Preferably, the high voltage current regulator circuit 10 of FIG. 1 is designed to have one or more of the following features:
FAULT CURRENT REGULATOR, having sufficient voltage and current handling capacity to limit fault currents in an electrical power grid, and, as described below in connection with FIG. 7, to also limit over voltage conditions in the electrical power grid.
GIC PROTECTION, having sufficient voltage and current capacity so that, when placed in the ground leg of a Wye-connected winding of a transformer or electrical generator of an electrical power grid, the bidirectional current-regulating circuit regulates geomagnetically-induced currents so as to prevent damage to the winding or generator. The circuit of the current invention is functional at the very low frequency (pseudo-DC) typical of GIC signals.
POWER FLOW CONTROL, having sufficient voltage and current handling capacity to control the flow of power in an electrical power grid.
CIRCUIT BREAKER, having a capability to regulate current between the first and second terminals 13 and 15 from full conduction (100%) to full cut-off (i.e., zero current flow) in a continuous analog function when desired, so that the current regulator circuit 10 can be used as a circuit breaker.

Implementing the foregoing capabilities will be routine to a person of ordinary skill in view of the present specification. These capabilities are further described as follows.

FAULT CURRENT REGULATOR. Fault current limiting is an extremely important technique that can be implemented in many places in an electrical power grid. It can be used to protect individual elements of such a grid, such as circuit breakers and transformers; it can be used as an active control element in so-called "Smart-grids"; and it can be used for protection from Geomagnetically Induced Currents (GIC), discussed as follows.

Figure 4:
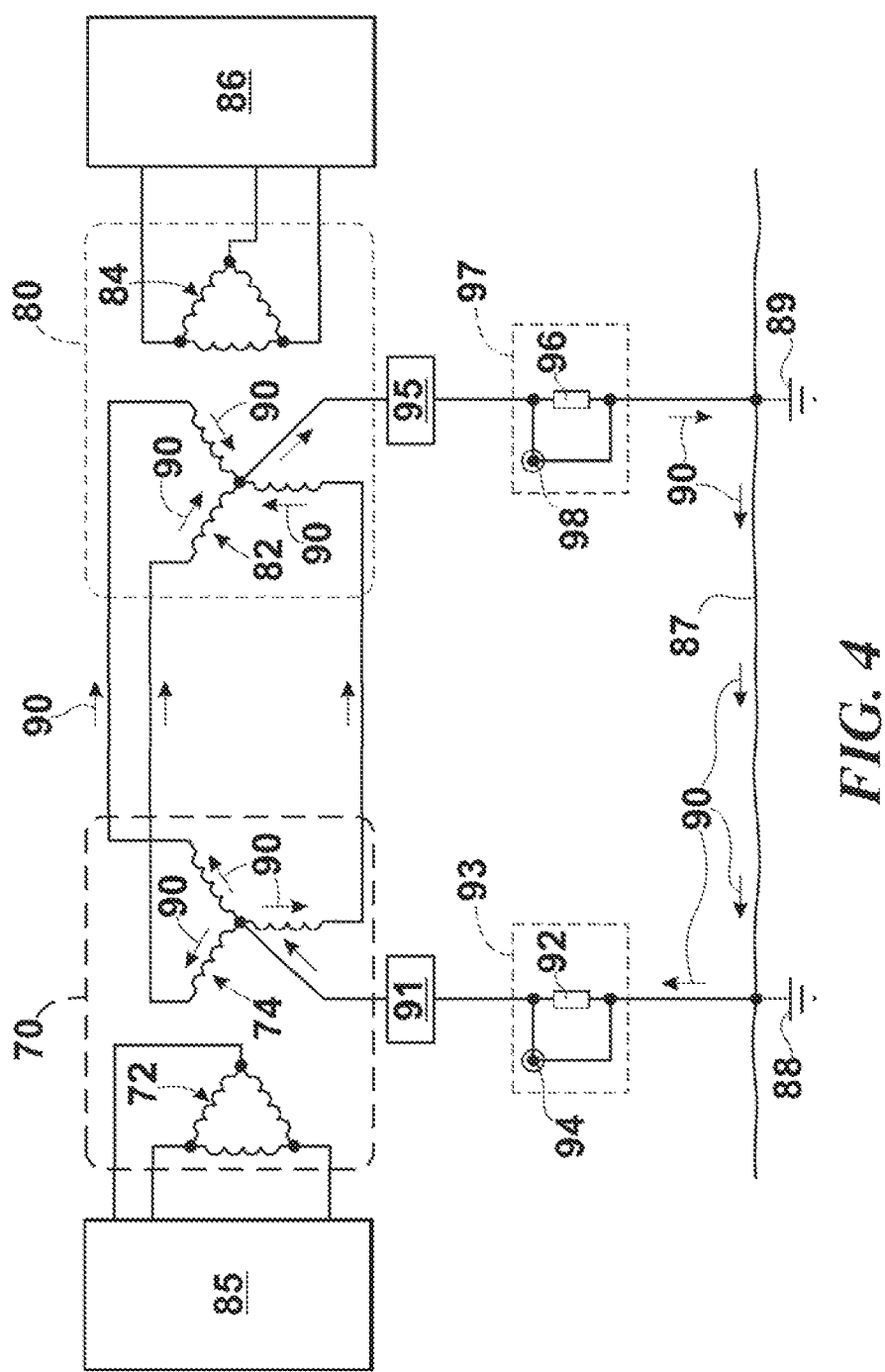
FIG. 4 is an electrical schematic diagram, partly in block form, of a pair of power transformers, which utilize a current-regulating aspect of the invention for protection from Geomagnetically Induced Currents (GIC).

GIC PROTECTION. One use of the current-regulating circuit of the invention is a fault current regulator to limit current and protect equipment from damage due to GIC. FIG. 4 shows three-phase transformers 70 and 80 connected between electrical power grid elements 85 and 86, where the elements are those set forth in the above definition of "electrical power grid." Transformer 70 has a primary winding 72 with three phases connected in a Delta configuration, and a secondary winding 74 with three phases connected in a Wye configuration. Transformer 80 similarly has a primary winding 82 connected in a Wye configuration and a secondary winding 84 with three phases connected in a Delta configuration. Reference numeral 87 refers to some tangible distance across the surface and upper crust region of the earth, and grounds 88 and 89 are earth grounds. GIC 90 is represented by a series of arrows, and constitute a pseudo DC current. GICs are described in more detail in US Pat. Pub. 2010/0097734 A1 dated Apr. 22, 2010, entitled Method and Apparatus for Protecting Power Systems from Extraordinary Electromagnetic Pulses.

FIG. 4 also shows the inclusion of high voltage, high current regulators 91 and 95 in respective ground legs of the Wye-connected windings 74 and 82 of transformers 70 and 80, attached to earth grounds 88 and 89, respectively. The current regulators 91 and 95, which may each comprise a high voltage current regulator circuit 10 of FIG. 1, for instance, act to limit GIC, which is a very low frequency pseudo DC current, or other DC current travelling in the ground legs of the Wye-connected transformer windings. In this way, the transformers 70 and 80 are protected against such pseudo DC or DC fault currents that may readily damage or destroy the transformer.

The current regulators 91 and 95 of FIG. 4 are controlled in response to current in the mentioned ground legs for windings 74 and 82 that is measured from the voltage on resistances 92 and 96 of respective high speed current shunts 93 and 97. For instance, the voltages on resistances 92 and 96 are provided a respective DC-AC differentiator circuit 100 of FIG. 5, for instance, for setting the REF. 1 and REF. 2 reference voltages (FIG. 1) of the current regulators 91 and 95. Such voltages are preferably transmitted to input terminal 101 of respective FIG. 5 DC-AC differentiator circuits, which control the current regulators in a way so as to allow AC transient currents to simply pass through the current regulators without restriction.

Figure 5:
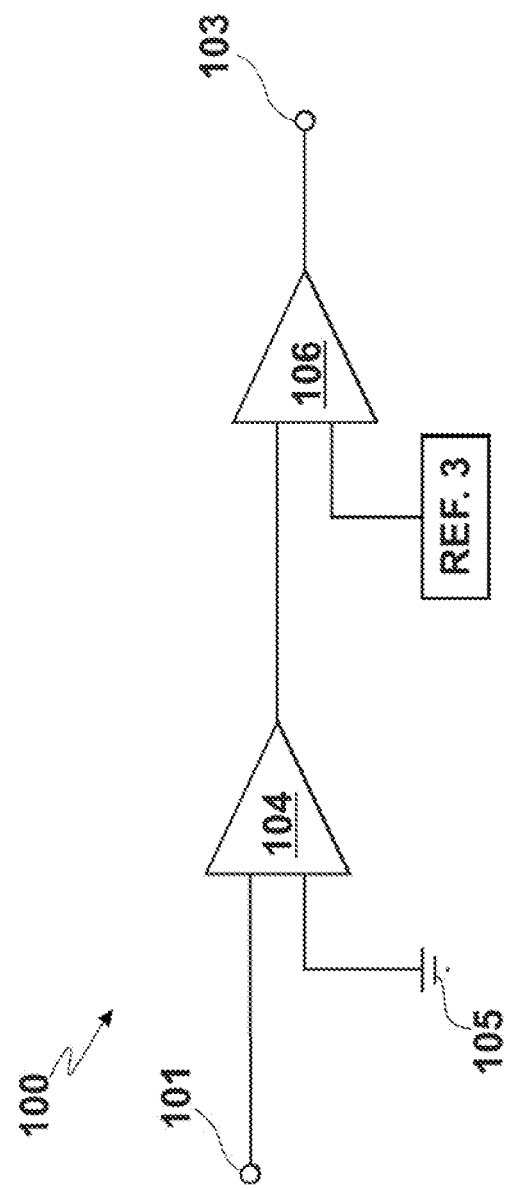
FIG. 5 is an electrical schematic diagram of circuitry for controlling the current regulators of FIG. 4 when used to protect the transformers from Geomagnetically Induced Currents (GIC).

The voltages on resistances 92 and 96 (FIG. 4) are preferably transmitted to input terminals 101 of respective FIG. 5 circuits by respective coaxial connection means 94 and 98. The foregoing and other details of the high speed current shunts are within the routine skill of the art, through the above-cited US Pat. Pub. 2010/0097734 A1 dated Apr. 22, 2010, entitled Method and Apparatus for Protecting Power Systems from Extraordinary Electromagnetic Pulses. A less desirable alternative to the use coaxial connection means 94 and 98 is a fiberoptic link (not shown) with an electrical-to-optical stage at the input end and an optical-to-electrical stage at the output end.

The voltages of the resistances 92 and 96, received by respective input terminals 101 of the FIG. 5 circuit, are applied to one input of a differential amplifier 104, whose other output is connected to ground 105. In the presence of a DC, or a pseudo DC current such as characterizes GIC, in the above-mentioned ground legs of transformer windings 74 and 82, the respective differential amplifiers 104 produce very little output. However, in the presence of transient AC current in the mentioned ground legs, the differential amplifiers 104 respectively produce a sharp spike. A respective Schmidt trigger 106, having one input receiving the output from a differential amplifier 104 and another input at a REF. 3 reference voltage, detects the foregoing spike, and creates a voltage at a respective output terminal 103, which is considerably higher than the normal REF. 1 and REF. 2 reference voltages (FIG. 1), and overrides those reference voltages to allow a high value of transient AC current to pass unhindered through the current regulators 93 and 97. The design of current regulators 93 and 97, including selection of the REF. 1 and REF. 2 reference voltages, determines the extent of the high value of current that is allowed to pass in the presence of an AC transient current.

The other input of the Schmidt trigger 106 is a reference voltage REF. 3, that is used to set a threshold for causing the Schmidt trigger 106 to send the foregoing described, overriding output voltage on output terminal 103 to allow a high value of transient AC current to pass unhindered through the current regulators 93 and 97. The lower the threshold that is set by REF. 3, the larger is the range of transient AC current that is allowed to pass unhindered through the current regulators 93 and 97.

In the absence of detected transient AC current in the above-mentioned ground legs of Wye-connected windings 74 and 82 in FIG. 4, the REF. 1 and REF. 2 reference voltages (FIG. 1) for each of current regulators 91 and 95 operate without override from an output 103 of a respective DC-AC differentiator circuit 100 of FIG. 5.

Differential amplifier 104 and Schmidt Trigger 106, or other threshold voltage detector, may be implemented with cold-cathode field emission tubes, or with other circuitry that can properly operate at the voltages and current levels that would be encountered. Such voltage and current levels may range upwards of 10 KV, or even 20-30 KV, and may range upwards of 100 KiloAmperes. Implementation of DC-AC differentiator circuit 100 will be routine to those of ordinary skill in the art based on the present specification.

The use of high voltage, high current regulators 91 and 95 in the circuit of FIG. 4 is superior to the use of resistors or capacitors (not shown) in the ground legs of a Wye-connected transformer, since resistors and capacitors are prone to failure and thus act more like fuses which burn out and consequently create an open circuit. Once a resistor or capacitor burns out and creates an open circuit, the circuit in which they are located becomes ungrounded and extremely hazardous. Capacitors are also limited by their voltage and current ratings, which are orders of magnitude lower than that which the current regulators 91 and 95 of FIG. 4 can safely and repeatedly handle.

Figure 6:
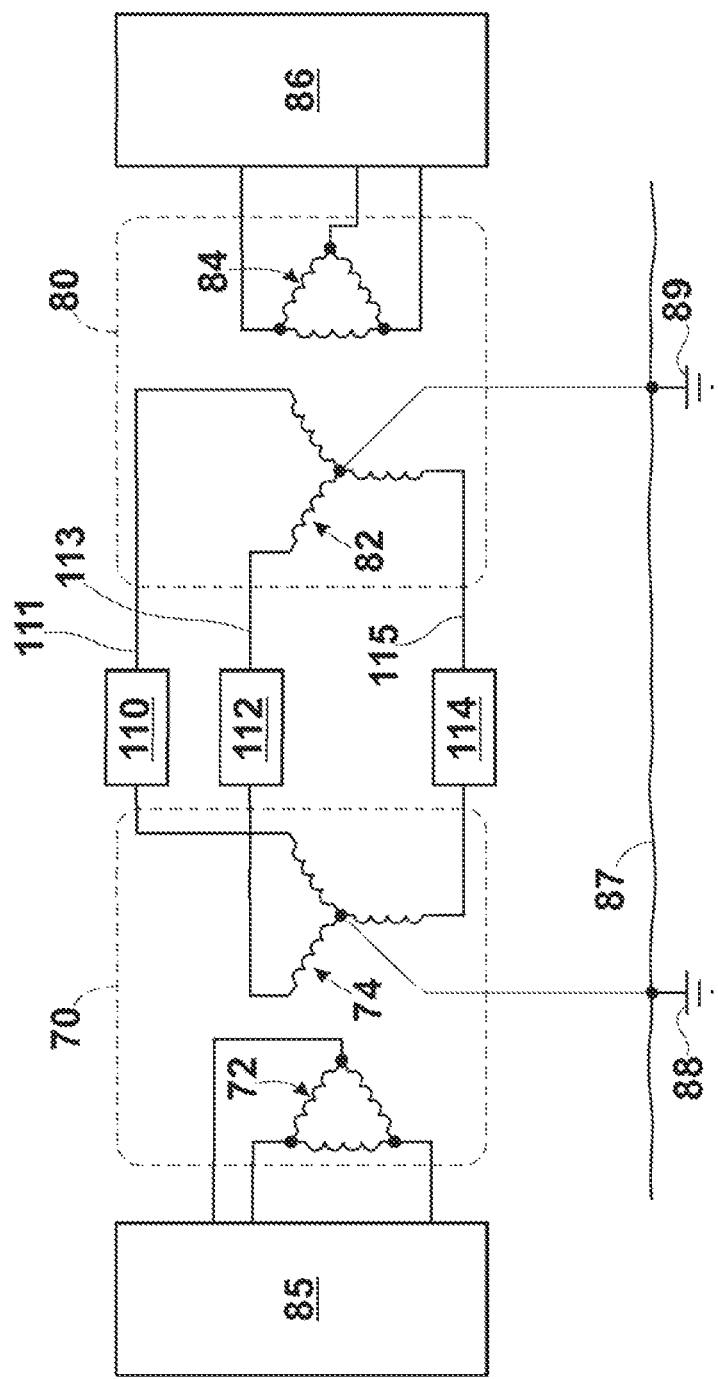
FIG. 6 is similar to FIG. 4, but shows a different use of the current-regulating aspect of the invention.

POWER FLOW CONTROL. An important application of the high voltage high current regulator 10 of FIG. 1 is to control the flow of power in an electrical power grid. This function is distinct from fault-current limiting, which is a protective function. Control of the flow of power is an energy management technique used to optimize transmission capacity of an electrical power grid. FIG. 6 shows an implementation of this application, and is generally similar to FIG. 4 and so uses the same reference numerals for the same parts. FIG. 6 shows the interposition of current regulators 110, 112, and 114, which may each comprise a high voltage current regulator circuit 10 of FIG. 1, for instance, in the respective conductors 111, 113 and 115 interconnecting the Wye-connected windings 74 of transformer 70 with the Wye-connected windings 82 of transformer 80. Current regulators 110, 112 and 114 can control power flow in an electrical power grid since the voltage of such grids is regulated to be approximately constant. Thus, control of the current level directly controls flow of electrical power. When used for power flow control, current regulators 110, 112 and 114 typically function to regulate current continuously or more continuously than when used for the purpose of limiting overcurrent transients.

Beneficially, the current regulators 110, 112, and 114 in the circuit of FIG. 6, for instance, may also be used for to remove an over-current condition in an electrical power grid.

CIRCUIT BREAKER. The high voltage high current regulator circuit 10 of FIG. 1 may advantageously be used to regulate current between first and second terminals 13 and 15 to a zero value in a continuous analog function when desired. In this way, current regulator circuit 10 can be used as a circuit breaker.

Other applications for the high voltage high current regulator 10 of FIG. 1 will be apparent to persons of ordinary skill in the art based on the present specification.

Combined Voltage Regulator and Current Regulator

Figure 7:
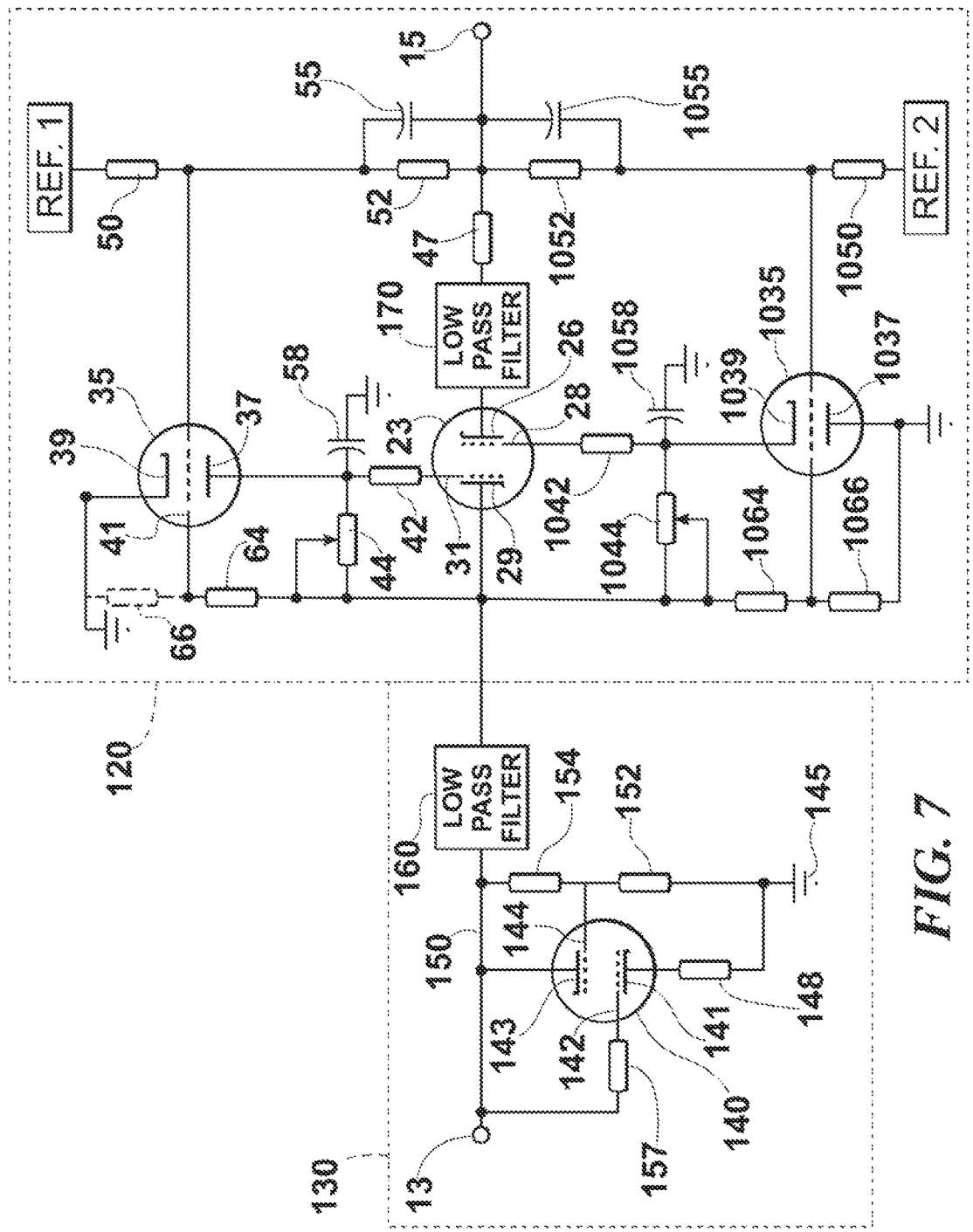
FIG. 7 is similar to FIG. 1, but shows a high voltage high current regulator circuit having both a current regulator circuit, as in FIG. 1, and a voltage-clamping circuit.

It is desirable to further enhance the functionality of the above-described high voltage high current regulator circuit 10 of FIG. 1 by the addition of a voltage-clamping circuit, as shown, for instance, in FIG. 7. This is because fault current surges, for instance, are frequently accompanied by over-voltage transients, and sometimes over-voltage transients occur by themselves. If of sufficient magnitude, such over-voltage transients can cause electrical insulation failures, leading to serious system damage.

Thus, FIG. 7 shows a current regulator circuit 120, similar to current regulator circuit 10 of FIG. 1, and having the same reference numerals as in FIG. 1 to indicate like part for which description in regard to FIG. 7 is thus unnecessary. FIG. 7 also shows a high voltage high current voltage-clamping circuit 130 interposed between the first and second terminals 13 and 15. A bidirectional cold-cathode field emission electron tube, or Bi-tron tube, 140, of the same description as the above-described Bi-tron tube 23 of FIG. 1, preferably has its outermost electrode or cathanode 141, comparable to cathanode 29 of FIG. 2, connected to ground 145 via a resistor 148 and its central electrode or cathanode 143 connected to conductor 150 that supplies current to current regulating circuit 120. Bi-tron tube 140 has a threshold operating voltage. A first control grid 142 is associated with outer electrode or cathanode 141 of Bi-tron tube 140, and a second control grid 144 is associated with inner electrode or cathanode 143 of Bi-tron tube 140. These grids 142 and 144 provide a means for control of current flow through Bi-tron tube 140.

An external circuit for biasing Bi-tron tube 140, comprising resistor 148 and resistors 152, 154 and 157, for instance, are used to set a threshold operating voltage for operation of tube 140. Selection of component values as well as variations in the biasing circuitry will be routine to those of ordinary skill in the art based on the present specification. A preferably ferrite, first low pass filter 160 may be provided between first terminal 13 and bidirectional current regulator circuit 120 for suppression of transients below the aforementioned threshold operating voltage of Bi-tron tube 140. The use of a ferrite filter advantageously avoids ferromagnetic resonances in the protected circuit.

The mentioned biasing circuit for Bi-tron tube 140 achieves voltage clamping to a predetermined value by selectively bleeding off from excess voltage from first terminal 13 to ground by the shunt configuration in which 140 tube is configured in the circuit of FIG. 7. A person of ordinary skill in the art will find it routine to design the mentioned biasing circuit for Bi-tron tube 140 in view of the present specification.

Preferably, the voltage-clamping circuit 130 precedes the bidirectional current regulator circuit 120 in the direction of power flow in an electrical power grid. This is because phase angle of current lags 90 degrees behind the phase angle of the voltage, and clamping voltage transients with voltage-clamping circuit 130 may be preferable before regulating current with current regulator circuit 120. However, voltage-clamping circuit 130 could follow the bidirectional current regulator circuit 120 in the direction of power flow in an electrical power grid.

In the bidirectional current regulator circuit 120, a preferably ferrite, second low pass filter 170 may be used to suppress any transients that may have escaped previous filtering or suppression.

An alternative to using a Bi-tron tube 140 in voltage-clamping circuit 130 of FIG. 6 is to use the pair of back-to-back, or anti-parallel, connected cold-cathode field emission electron tubes 24 and 25 of FIG. 3.

High Voltage High Current Vacuum Integrated Circuit

As conceived by the present inventor, as is the case in the semiconductor industry, integration of circuit function would be advantageous with high voltage high current vacuum tube circuits. In the case of electron tube circuits, integration provides a way to provide functional blocks of circuitry as opposed to discrete components, but is distinguished from semiconductor integrated circuits due to often vastly different voltage and current operating regimes, as well as totally different physical manifestations and operating principles.

In one embodiment, the high voltage current regulator circuit 10 of FIG. 1 is implemented as three separate tubes such as shown, for instance in FIGS. 6E, 12 and 13 of Pub. No. US 2010/0195256 A1 dated Aug. 5, 2010, entitled Method and Apparatus for Protecting Power Systems from Extraordinary Electromagnetic Pulses, which are interconnected in a circuit. In contrast, as shown in FIG. 8, a preferred embodiment incorporates at least the cold-cathode field emission electron tubes of FIG. 1 or FIG. 7 into a single stainless steel vacuum enclosure 180 of circular cross-section along its length, or horizontal direction as shown in in FIG. 8, so as to form a high voltage high current vacuum integrated circuit (HVHC VIC).

With reference to FIG. 7, in addition to placing electron tubes 140, 23, 35 and 1135 into common vacuum enclosure 180 (FIG. 8), the enclosure 180 may also house low pass filters 160 and 170, for instance. Since it is difficult to repair electrical components within the vacuum enclosure 180, it is usually best practice to house only vacuum-tolerant and reliable electrical components within the enclosure. This practice may indicate that some or all of the associated resistors and capacitors shown in FIG. 7 should be located external to the vacuum enclosure.

Figure 8:
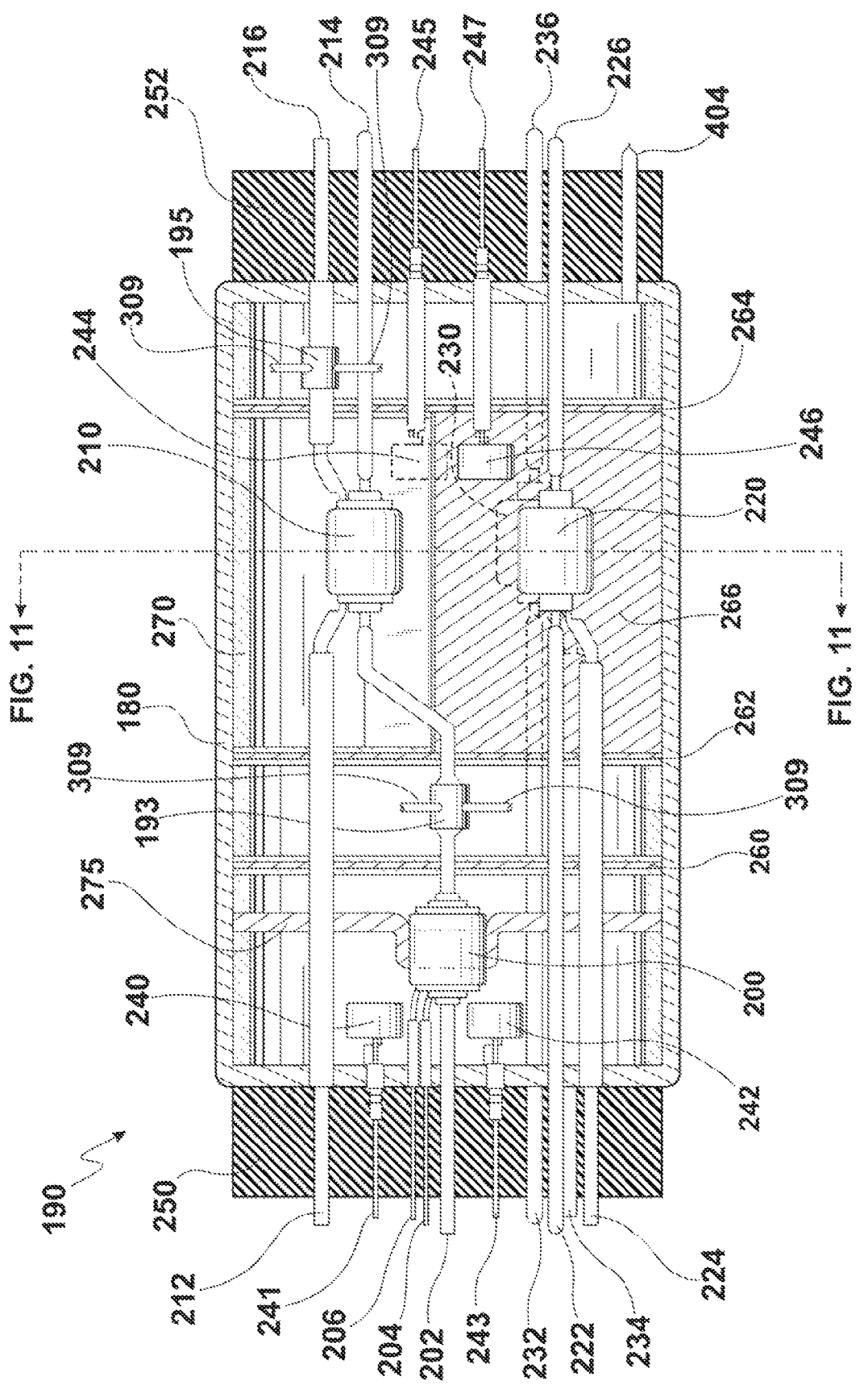
FIG. 8 is a simplified, longitudinal cross-sectional view through the central axis of a high voltage high current vacuum integrated circuit, modified to show internal components in the foreground.

Correspondence between parts within vacuum enclosure 180 of FIG. 8 and the circuit of FIG. 7 are as follows:

| Parts in FIG. 8 | Circuit of FIG. 7 |
|---|---|
| Bi-tron tube 200 | Bi-tron tube 144 |
| Bi-tron tube 210 | Bi-tron tube 23 |
| Pulsatron tube 220 or 230 | Pulsatron tube 35 |
| Pulsatron tube 230 or 220 | Pulsatron tube 1135 |
| Low pass filter 193 | Low pass filter 160 |
| Low pass filter 195 | Low pass filter 170 |

Referring back to FIG. 8, vacuum enclosure 180 also includes conventional chemical getter pumps 240, 242, 244 and 246, which are shown mounted on conventional vacuum-sealed, electrically insulated feedthroughs 241, 243, 245 and 247, respectively. Although not shown, preferably, the getter pumps 240, 242, 244 and 246 are mounted on one or more internal electrical buses, that are, in turn, connected to one or more conventional vacuum-sealed, electrically insulated feedthroughs. In addition to chemical getter pumps, or as an alternative to chemical getter pumps, electric vacuum pumps (not shown) within or external to the vacuum enclosure 180, could be used. The capacity of, and number of, vacuum pumps that will be required for any particular vacuum enclosure is a routine determination to those of ordinary skill in the art.

Other electrical leads are brought out from vacuum enclosure 180 from other electrical components within the enclosure, so as to enable electrical connections to external circuitry and to external resistors, capacitors or other electrical components such as those shown in FIG. 7. The connections can be conventional vacuum sealed, electrically insulated feedthroughs 202, 204 and 206 for Bi-tron tube 200, the same type of feedthroughs 212, 214 and 216 for Bi-tron tube 210, the same type of feedthroughs 222, 224 and 226 for Pulsatron tube 220, and the same type of feedthroughs 232, 236 and 236 for Pulsatron tube 230. Alternatively, if flexible leads are desired, as compared to the usually rigid vacuum sealed, electrically insulated feedthroughs just mentioned, then conventional flexible "flying leads" can be used to allow external connection to the electrodes of the electron tubes or other electrical components within the vacuum enclosure 180.

The various electrical components in vacuum enclosure 180 may be arranged in many different manners. A preferred approach is to have Bi-trons 200 and 210 aligned with each other along their respective longitudinal axes, rather than to be offset from each other as shown in FIG. 8. A further variation is to use more than one HVHC VIC, each having its own vacuum enclosure for housing fewer than all the parts shown in the circuit of FIG. 7, for example, which may afford more flexibility in the overall dimensions of all aggregate circuit components.

FIG. 8 shows the optional, preferred use electrical potting compound 250 and 252 to provide electrical insulation between conductors of conventional high vacuum electrical feedthroughs in transition regions where electrical leads emerge from the vacuum enclosure 180. Such potting compounds may be selected from various rubbers and other elastomers, plastics, and ceramics, with ceramics being preferred for highest temperature use. When using the alternative of "flying leads," as mentioned above, the use of potting compound is strongly preferred.

Figure 9:
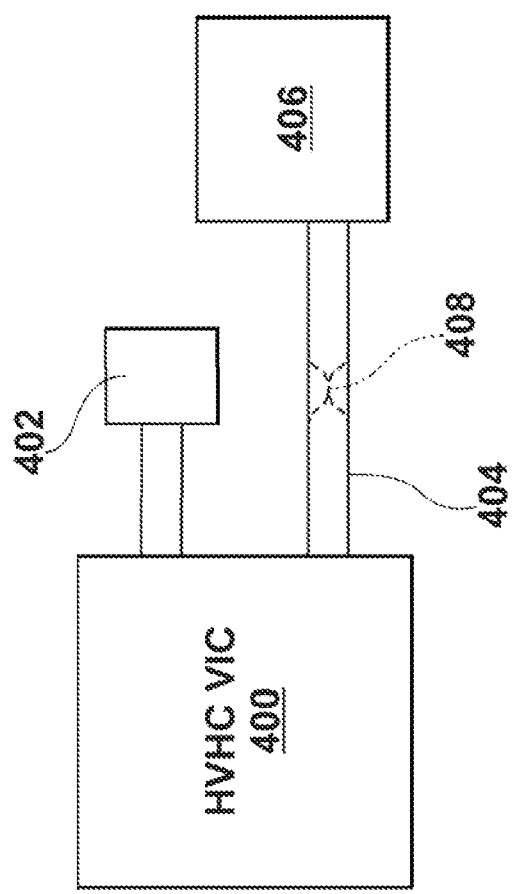
FIG. 9 is a block diagram of an HVHC VIC and various external vacuum pumps.

FIG. 9 shows a HVHC VIC 400, such as shown in FIG. 8, connected to an external vacuum pump 402, whose purpose is to maintain the necessary high vacuum within HVHC VIC 400 during operation.

FIG. 9 also shows HVHC VIC 400 connected to a large, external vacuum pumping system 406, whose purpose is to evacuate HVHC VIC 400 during manufacturing, by an exhaust tubulation 404. The exhaust tubulation 404 is typically a short length of metal pipe. At the conclusion of the evacuation process, the exhaust tubulation 404 is "pinched off" by a tool (not shown) to provide a robust vacuum seal for both the HVHC VIC 400 and the external vacuum pumping system 406, as will be routine to persons of ordinary skill from the present specification.

Referring back to the HVHC VIC 190 of FIG. 8, a pinched-off exhaust tubulation 404 is shown in the lower right corner of the drawing.

Multiple Circuit Functions Implemented in HVHC VIC

As the foregoing makes clear, multiple electrical components housed within common vacuum enclosure enable multiple circuit functions within HVHC VIC 190 of FIG. 8. The various electrical connections from electrical components internal to vacuum enclosure 180 to external circuitry or electrical components allows a single, multiple tube HVHC VIC to address differing requirements by only changing the external electrical components.

The vacuum enclosure 180 of FIG. 8 also typically includes various electrically insulating mechanical support structures, such as internal magnetic shields 260, 262, 264 and 266, discussed in detail below, and electrical grounding support 275 for Bi-tron 200. Grounding support 275 is typically provided with vent openings (not shown) for the purpose of improving vacuum conductance and providing pressure equalization within the vacuum enclosure 180. Enclosure 180 also typically contains many ceramic insulators, such as cylindrically shaped insulator 270, just within vacuum enclosure 180. FIG. 8 omits various electrically insulating mechanical support structures and ceramic insulators for clarity of illustration; use of such support structures and insulators will be routine to those of ordinary skill in the art.

Benefits of High Voltage High Current Vacuum Integrated Circuit

By incorporating multiple cold-cathode field emission electron tubes and, preferably, other electrical components within common vacuum enclosure 180, in a HVHC VIC 190, installation of the circuitry housed within the enclosure is simplified, and typically requires less space from installation. This reduces the cost of installation, and increases system reliability by reduction of the mean time between failures for the present HVHC VIC.

By implementing multiple circuit functions in the same vacuum enclosure, the present HVHC VIC is somewhat similar to semiconductor circuits. However, the motivation for a HVHC VIC is significantly different from that of a semiconductor integrated circuit (IC). In a semiconductor IC, the primary reason for integration is to increase circuit density. In a VIC, the primary motivation is to increase reliability and simplify installation into a system. HVHC VIC's are primarily intended for use in high voltage, high current, high power electronics circuits, a field in which semiconductors are not able to operate. Similarly, HVHC VIC's are not practical to manufacture for voltages below 400 volts. Below 400 volts, semiconductor devices are more practical. At substantially above 400 volts, semiconductors become progressively less useful as the voltage and current requirements of the circuit increase. By 26,000 Volts, there are no single semiconductor devices known. In comparison, cold-cathode field emission electron tubes within a HVHC VIC can operate at considerably higher voltages, including voltages of 1.2 million Volts and higher, and at simultaneous currents in the hundreds to thousands of MegaAmperes. Further, the very high arc resistance of electron tubes and their superior thermal performance make electron tubes appropriate for integration into a HVHC VIC.

The claimed invention implements sophisticated circuit functions, responding to different external conditions with different response modes, as previously described.

Definitions Concerning Magnetic Shields

The following two sections on Internal Magnetic Shielding and External Magnetic Shielding use the following, various terms that have the following meaning herein:

"Magnetic shield" means a structure including magnetic shielding material formed either (1) fully from magnetic shielding metal, or (2) as a mixture of magnetic shielding metal and non-magnetic material, such as electrically insulating ceramic. A magnetic shield may be covered with electrically insulating material to prevent arcing from high voltages.

"Magnetic insulation" is used interchangeably with the "magnetic shielding material" as defined in the foregoing definition of "magnetic shield."

"Electrical insulation" means dielectric material such as an electrically insulating ceramic.

"Electrical and magnetic insulation" means a combination of the foregoing-defined "electrical insulation" and "magnetic insulation."

Variants of the foregoing terms, such as "magnetically insulating" and "electrically insulating" have similar meanings as found in the foregoing definitions.

As used herein, "vacuum-grade" refers to materials that do not exhibit the property of outgassing; that is, the property of gasses being released from interstitial spaces within the atomic or molecular structure of such material in the presence of reduced pressure and temperature or both reduced pressure and temperature.

"Thin" magnetic material is defined herein as a material where the absolute value of its surface area is substantially greater than the absolute value of its thickness.

External Magnetic Shielding

In designing a HVHC VIC, the adverse impact of external magnetic fields should be considered, to make sure that any such external fields do not adversely affect the performance of electrical components within the HVHC VIC. In this connection, the vacuum enclosure 180 (FIG. 8) can be formed from high-permeability magnetic shielding metal (not shown), or a liner (not shown) of such material can be interposed between the metallic vacuum enclosure 180 and the ceramic insulator 270 just inside enclosure 180. For enhanced magnetic shielding, multiple layers (not shown) of alternating high permeability and low permeability magnetic shielding metals can be used; and for still more enhanced magnetic shielding, electrically and magnetically insulating dielectric material (not shown) can be interposed between the foregoing alternating layers. Enhanced magnetic shielding may also be attained by interposing the foregoing type of dielectric material between layers of material having the same permeability, for instance. The selection of any foregoing techniques, and others, for providing shielding of electrical components within an HVHC VIC from external magnetic fields will be routine to persons of ordinary skill in the art based on the present specification.

Internal Magnetic Shielding

A design consideration for a HVHC VIC 190 of FIG. 8, for example, is whether the magnetic fields produced by electrical components within common vacuum enclosure 180, which may be in relatively close proximity to each other, adversely affects operation of other electrical components within such enclosure. Sources for strong magnetic fields may arise from, for instance:

Electron tubes within the vacuum enclosure 180 (FIG. 8) may typically have high energy electron beams that create strong magnetic fields while passing through the interelectrode spaces of the electron tube. If such magnetic fields are sufficiently strong, such fields can distort the trajectories and overall symmetry of electron beams within adjacent electron tubes within the enclosure 180.

When low pass filters 193 and 195 within vacuum enclosure 180 are of the ferrite type, such filters can, under some circumstances, also produce substantial magnetic fields that can distort the trajectories and overall symmetry of electron beams within adjacent electron tubes in the enclosure.

To address the foregoing problem of adversely high magnetic fields within the vacuum enclosure 180, the magnetic shields 260, 262, 264 and 266 can be used to separate electrical components within vacuum enclosure 180 from one or more other components. The number, geometry, and composition of magnetic shields such as 260, 262, 264 and 266 depend on the specific configuration of a desired HVHC VIC, and in particular the spacing interrelationships between internal magnetic field-producing components and internal electron tubes or other components whose operation could be adversely affected by internal magnetic fields.

Placing a magnetic shield including magnetic shielding metal in the common vacuum enclosure 180 (FIG. 8) with cold-cathode field emission tubes 200, 210, 220 and 230, that can be configured to operate at high voltage, potentially raises the undesirable problem of internal electrical arcing and component failure. Thus, it is desirable to electrically insulate the magnetic shields by encapsulating them in an electrical insulator such as electrically insulating ceramic or other refractory material of appropriate dielectric strength and thickness. For simplicity of explanation for the remainder of this section entitled Internal Magnetic Shielding, the reference to "ceramic" is intended to mean "ceramic" as well as alternatives to ceramic.

Figure 10:
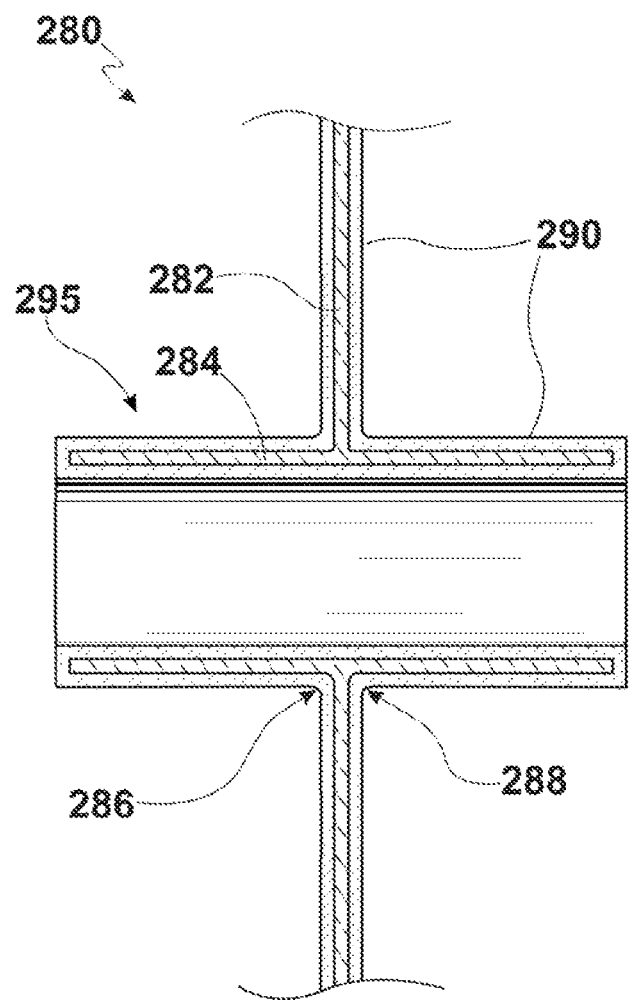
FIG. 10 is a cross-sectional side view of a portion of a magnetic shield having a penetration for equalizing vacuum on both sides of the shield.

Thus, FIG. 10 shows a portion of a magnetic shield 280, having vertically extending high permeability magnetic shielding metal 282 and a tubular shaped high permeability magnetic shielding metal 284, preferably joined together at locations 286 and 288 by welding and annealing, and then encapsulated in an electrically insulating ceramic 290. Preferably, in each location 286 and 288, the ceramic 290 is formed as a fillet for purposes of reducing stress due to a concentration of the electric field.

The resulting hollow, magnetically shielded tube 295 provides venting and pressure equalization within the vacuum enclosure 180 (FIG. 8), and would be located preferably close to chemical getter vacuum pumps for optimal vacuum pumping. Magnetically shielded tube 295 preferably has an aspect ratio defined by the ratio of its internal diameter to its length being one to four or greater. This aspect ratio arises from the way in which magnetic field lines flow around an aperture in a tubular structure. By maintaining this ratio, the magnetic shielding properties of the shield wall, through which the tube passes, are maintained. One or more magnetically shielded tubes 295 are required to assure uniform vacuum within vacuum enclosure 180 as shown in FIG. 8, although they are not shown in FIG. 8 for simplicity.

Magnetic shielding metal 282 and 284 is preferably all metal, but could instead be formed of a mixture of high concentration, finely divided magnetic shielding metal in high concentration with an electrically insulating ceramic, which is then molded into a desired shape, encapsulated in electrically insulating ceramic 290, and then fired to sinter and harden the ceramics. Preferably, the initial finely divided ceramic particles and the encapsulating ceramic have the same chemical composition, to minimize thermal expansion mismatch. In all of the above ceramic-encapsulating scenarios, the firing of the outer ceramic and, optionally of any interior composite ceramic and magnetic material preferably performs the additional function of annealing the magnetic shield metal to develop its full shielding potential.

The above description of external magnetic shielding, under the prior heading "External Magnetic Shielding," includes variations from using a single layer of high permeability magnetic shielding metal for magnetic shielding. Such variations apply as well to internal magnetic shielding, so that the high permeability magnetic shielding metals 282 and 284 of FIG. 10 could be replaced with alternating layers of high permeability and low permeability magnetic shielding metals, by way of example. The selection of appropriate magnetic shielding metals will be routine to those of ordinary skill in the art based on the present specification.

Figure 11:
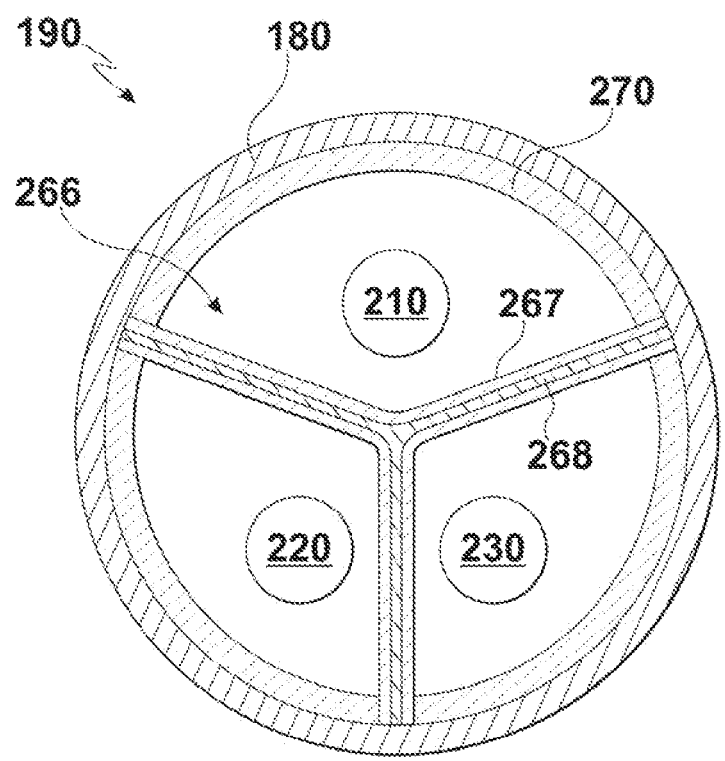
FIG. 11 is an enlarged, simplified cross-sectional view taken at the arrows marked FIG. 11, FIG. 11 in FIG. 8.

FIG. 11 shows a better view of magnetic shield 266 of FIG. 8, which has a Y-shape in cross section, which may be an electrical insulator such as electrically insulating ceramic 267 over magnetic shielding metal 268 such as pure or mixed magnetic metal, similar to magnetic shield 280 in FIG. 11 as described above. Preferably, the magnetic shielding metal 268 is attached to vacuum enclosure 180 by welding when the vacuum enclosure is stainless steel or other electrically conductive metal, and, as shown in FIG. 8, is also attached to the magnetic shielding material of the adjacent magnetic shields 262 and 264. Similarly, in FIG. 8, the inner magnetic shielding material for magnetic shields 260, 262 and 264, shown with metal cross-hatching are welded to the vacuum enclosure 180 when the vacuum enclosure is stainless steel or other electrically conductive metal.

Bi-tron tube 210 and Pulsatron tubes 220 and 230 are shown as simple circles, and many other structures are omitted for clarity. FIGS. 8 and 10 thus show that each of Bi-tron tubes 200 and 210, Pulsation tubes 220 and 230, and low pass filters 193 and 195 are separated from each other by associated electrically and magnetically insulated shields 260, 262, 264 and 266, and each may be considered to be in its own internally electrically and magnetically insulated compartment. Of course, more than one internal electrical component can exist in the same internally electrically and magnetically insulated or electrically insulated compartment if the magnetic field from one component does not adversely affect operation of the other components, and so forth.

It is desirable to have chemical getter vacuum pumps in any compartment or region of the vacuum enclosure 180 (FIG. 8) that contains an electron tube or tubes. This maximizes the conductance, and hence, efficiency of the chemical getter pumps from the perspective of such electron tubes. It is possible to minimize the number of getter pumps by providing electrically and magnetically insulated tubes 295 (FIG. 10) which provide improved vacuum conductance-and-pressure equalization orifices between compartments, provided that this can be accomplished without compromising the electrical and magnetic insulation properties of the shields or separators between compartments.

As presently shown in FIG. 8, low passfilters 193 and 195 are shielded from other electrical components within vacuum enclosure 180 of HVHC VIC 190 of FIG. 8 by magnetic shields 260, 262 and 264. An alternative or additional way of magnetically shielding low pass filters 193 and 195 is now described in connection with FIG. 12.

FIG. 12 shows a preferred construction of a combined low pass filter 300. A ferrite filter sleeve 303 is placed on a conductor 305, and forms the inner plate of a bypass capacitor, as well as providing a blocking function for high frequency signals. An outer tubular electrode 307 forms the outer plate of the bypass capacitor. A respective low pass filter 300 provides the filtering described above for each of low pass filters 160 and 170 of FIG. 7. Additional or alternative RF filtering components (not shown) may be incorporated in the vicinity of the illustrated low pass filters 193 and 195 in FIG. 8, which implement low pass filters 160 and 170 of FIG. 7, respectively.

Low pass filter 300 includes grounding spokes 309. Although not shown in the figures, grounding spokes 309 can attach to the vacuum enclosure 180 (FIG. 8) or another grounded structure, preferably in such a way as to beneficially provide both electrical grounding and mechanical support for low pass filter 300.

In regard to an alternative, or additional, way of magnetically shielding low pass filters 193 and 195 (FIG. 8), outer tubular electrode 307 can be formed of magnetic shielding metal, such as mu metal. In such embodiment, the low pass filter 300 acts to magnetically shield other electrical components within vacuum enclosure 180 (FIG. 8) from magnetic fields generated by low pass filters 193 and 195. In this connection, the right and left-shown ends of the outer tubular electrode 307 should each extend beyond ferrite filter sleeve 303 so as to restrict the angle of emission of magnetic fields from within outer tubular electrode 307.

Additional Benefits of Internal Magnetic Shields

In addition to providing electrical and magnetic insulation, magnetic shields 260, 262 and 264 in FIG. 8 provide significant mechanical support to various internal electrical components. For instance, various of the electrically insulated feedthroughs, such as 212 and 214, through various of the electrically insulated magnetic shields, e.g., 260, 262 and 264, and are advantageously mechanically supported by such shields.

The following is a list of reference numerals and associated parts as used in this specification and drawings:

| Reference Numeral | Part |
|---|---|
| 10 | High voltage current regulator circuit |
| 13 | First terminal |
| 15 | Second terminal |
| 18 | Dashed-line loop |
| 20 | Dashed-line loop |
| 23 | Bidirectional cold-cathode field emission tetrode tube/Bi-tron tube |
| 24 | Cold-cathode field emission electron tube |
| 25 | Cold-cathode field emission electron tube |
| 26 | Cathanode |
| 27 | Main current-carrying electrode |
| 28 | Grid |
| 29 | Cathanode |
| 30 | Main-current carrying electrode |
| 31 | Grid |
| 33 | Grid |
| 34 | Grid |
| 35 and 1035 | High voltage electron tube/Pulsatron tube |
| 37 and 1037 | Anode |
| 39 and 1039 | Cathode |
| 42 and 1042 | Resistor |
| 44 and 1044 | Adjustable resistor |
| 47 | Shunt resistor |
| 50 and 1050 | Resistor |
| 52 and 1052 | Resistor |
| 55 and 1055 | Capacitor |
| 58 and 1058 | Capacitor |
| 64 and 1064 | Resistor |
| 66 and 1066 | Resistor |
| 70 | Three-phase transformer |
| 72 | Primary winding |
| 74 | Secondary winding |
| 80 | Three-phase transformer |
| 82 | Secondary winding |
| 84 | Primary winding |
| 87 | Earth |
| 88 | Earth ground |
| 89 | Earth ground |
| 90 | Geomagnetically induced current |
| 91 | Current regulator |
| 92 | Resistance |
| 93 | High speed current shunt |
| 94 | Coaxial cable connection |
| 95 | Current regulator |
| 96 | Resistance |
| 97 | High speed current shunt |
| 98 | Coaxial cable connection |
| 100 | DC-AC differentiator circuit |
| 101 | Input terminal |
| 103 | Output terminal |
| 104 | Differential amplifier |
| 105 | Ground |
| 106 | Schmidt trigger |
| 110 | Current regulator |
| 111 | Conductor |
| 112 | Current regulator |
| 113 | Conductor |
| 114 | Current regulator |
| 115 | Conductor |
| 120 | Current regulator circuit |
| 130 | High voltage high current voltage-clamping circuit |
| 140 | Bidirectional cold-cathode field emission electron tube, or Bi-tron tube |
| 141 | Outermost electrode or cathanode |
| 142 | First control grid |
| 143 | Central electrode or cathanode |
| 144 | Second grid |
| 145 | Ground |
| 148 | Resistor |
| 150 | Conductor |
| 152 | Resistor |
| 154 | Resistor |
| 157 | Resistor |
| 160 | First low pass filter |
| 170 | Second low pass filter |
| 180 | Vacuum enclosure |
| 190 | High voltage high current vacuum integrated circuit |
| 193 | Low pass filter |
| 195 | Low pass filter |
| 200 | Cold-cathode field emission election tube, or Bi-tron tube |
| 202 | Electrically insulated feedthrough |
| 204 | Electrically insulated feedthrough |
| 206 | Electrically insulated feedthrough |
| 210 | Cold-cathode field emission election tube, or Bi-tron tube |
| 212 | Electrically insulated feedthrough |
| 214 | Electrically insulated feedthrough |
| 216 | Electrically insulated feedthrough |
| 220 | Cold-cathode field emission election tube, or Pulsatron |

-continued

| Reference Numeral | Part |
|---|---|
| 222 | Electrically insulated feedthrough |
| 224 | Electrically insulated feedthrough |
| 226 | Electrically insulated feedthrough |
| 230 | Cold-cathode field emission election tube, or Pulsatron |
| 232 | Electrically insulated feedthrough |
| 234 | Electrically insulated feedthrough |
| 236 | Electrically insulated feedthrough |
| 240 | Chemical getter pump |
| 241 | Electrically insulated feedthrough |
| 242 | Chemical getter pump |
| 243 | Electrically insulated feedthrough |
| 244 | Chemical getter pump |
| 245 | Electrically insulated feedthrough |
| 246 | Chemical getter pump |
| 247 | Electrically insulated feedthrough |
| 250 | Potting compound |
| 252 | Potting compound |
| 260 | Magnetic shield |
| 262 | Magnetic shield |
| 264 | Magnetic shield |
| 266 | Magnetic shield |
| 267 | Ceramic |
| 268 | High permeability magnetic shielding metal |
| 270 | Ceramic insulator |
| 275 | Grounding support |
| 280 | Magnetic shield |
| 282 | High permeability magnetic shielding metal |
| 284 | High permeability magnetic shielding metal |
| 286 | Location |
| 288 | Location |
| 290 | Ceramic |
| 295 | Magnetically shielded tube |
| 300 | Low pass filter |
| 303 | Ferrite filter sleeve |
| 305 | Conductor |
| 307 | Outer tubular electrode |
| 309 | Grounding spokes |
| 400 | Vacuum integrated circuit |
| 402 | External vacuum pump |
| 404 | Exhaust tubulation |
| 405 | Pinched-off exhaust tubulation |
| 406 | Exhausting vacuum pumping system |
| 408 | Location of pinch-off |

While the invention has been described with respect to specific embodiments by way of illustration, many modifications and changes will occur to those skilled in the art. For instance, while the above-described high voltage high current regulator and voltage clamp of the present invention is primarily intended for operation in AC circuits, it will function equally effectively in DC and pseudo DC circuits. Additionally, whereas cylindrical electrode geometry is preferred for the various electron tubes described herein, similar or the same as the geometry shown in FIG. 2, electron tubes having other geometries, such as planar, arcuate or spherical, by way of example, may be used. It is, therefore, to be understood that the claims are intended to cover all such modifications and changes as fall within the true scope and spirit of the invention.

What is claimed is:

1. A high voltage high current regulator circuit for being interposed between first and second terminals that are connected to an external circuit, comprising:
   a) a bidirectional current-regulating circuit connected between the first and second terminals for receiving and regulating current between the first and second terminals; the current-regulating circuit comprising at least one main-current carrying cold-cathode field emission electron tube that conducts current between the first and second terminals; the at least one main-current carrying cold-cathode field emission electron tube having first and second control grids for controlling current conduction between the first and second terminals when the voltage on the first and second terminals is positive and negative, respectively; and
   b) first and second grid-control cold-cathode field emission electron tubes respectively providing control signals for said first and second control grids.

2. The regulator circuit of claim 1, wherein harmonic-reduction circuitry is connected to the first and second control grids to reduce the generation of voltages that are harmonics of a main frequency of voltage present on the first and second terminals.

3. The regulator circuit of claim 1, wherein the at least one main current carrying cold-cathode field emission electron tube comprises a pair of back-to-back connected cold-cathode field emission electron tubes.

4. The regulator circuit of claim 3, wherein each of the back-to-back connected cold-cathode field emission electron tubes has main current-carrying electrodes of concentric cylindrical geometry.

5. The regulator circuit of claim 1, wherein the at least one main current carrying cold-cathode field emission electron tube comprises a single cold-cathode field emission electron tube having first and second cathanodes and respectively associated first and second control grids.

6. The regulator circuit of claim 5, wherein the single cold-cathode field emission electron tube has cathanodes of concentric cylindrical geometry.

7. The regulator circuit of claim 1, wherein the bidirectional current-regulating circuit is designed to regulate current between said first and second terminals to a zero value in a continuous analog function when desired, through adjusting the amount of current in said at least one main-current carrying cold-cathode field emission electron tube, so that it can be used as a circuit breaker.

8. The regulator circuit of claim 1, further comprising an adjustable voltage-clamping circuit interposed between the first and second terminals; the voltage-clamping circuit comprising:
   a) a bidirectional voltage clamp including at least one cold-cathode field emission electron tube; the bidirectional voltage clamp having an adjustable threshold operating voltage; first and second control grids associated with the at least one cold-cathode field emission electron tube and receptive of respective control signals for modulating voltage in a main current-conducting path between the first and second terminals; and
   b) a circuit for biasing the voltage clamp via said first and second control grids to set said adjustable threshold operating voltage.

9. The regulator circuit of claim 8, further comprising:
   a) one or more low pass filters for suppression of voltage transients, on said main current-conducting path, below said threshold operating voltage of said regulator circuit; each of said low pass filters comprising a capacitor;
   b) each capacitor comprising a ferrite filter sleeve placed on a first conductor of the capacitor and fitted into a surrounding tubular second conductor of the capacitor; the second conductor being electrically grounded; and
   c) the ferrite sleeve forming an inner plate of a capacitor and the second conductor forming the outer plate of said capacitor.

10. A method of using the regulator circuit of claim 1, comprising the steps of:
   a) interposing the bidirectional current-regulating circuit in a current-carrying conductor of an electrical power grid; and
   b) configuring the bidirectional current-regulating circuit to remove an over-current condition in the electrical power grid.

11. A method of using the regulator circuit of claim 1, comprising the steps of:
   a) interposing the bidirectional current-regulating circuit in a current-carrying conductor of an electrical power grid;
   b) regulating the electrical power grid so that voltage on electrical transmission lines is approximately constant; and
   c) configuring the bidirectional current-regulating circuit to control the flow of power through said current-carrying conductor.

12. A method of using the regulator circuit of claim 1, comprising the steps of:
   a) interposing the bidirectional current-regulating circuit in a ground leg of a Wye-connected winding of electrical equipment of an electrical power grid;
   b) providing a DC-AC differentiator circuit for discriminating between AC and DC or pseudo-DC signals in said ground leg and for generating a control signal to cause current regulator function to be bypassed during the presence of an undesirable AC transient signal; wherein the DC-AC differentiator circuit enables a current regulator functionality in the presence of geomagnetically-induced currents in said ground leg so as to prevent damage to said electrical equipment.

13. An adjustable voltage-clamping circuit interposed between first and second terminals that are connected to an external circuit, the voltage-clamping circuit comprising:
   a) a bidirectional voltage clamp including at least one cold-cathode field emission electron tube; the bidirectional voltage clamp having an adjustable threshold operating voltage; first and second control grids associated with the at least one cold-cathode field emission electron tube and receptive of respective control signals for modulating voltage in a main current-conducting path between the first and second terminals; and
   b) a circuit for biasing the voltage clamp via said first and second control grids to set said adjustable threshold operating voltage.

14. The adjustable voltage-clamping circuit of claim 13, further comprising:
   a) one or more low pass filters for suppression of voltage transients, on said main current-conducting path, below said threshold operating voltage of said bidirectional voltage clamp; each of said low pass filters comprising a capacitor;
   b) each capacitor comprising a ferrite filter sleeve placed on a first conductor of the capacitor and fitted into a surrounding tubular second conductor of the capacitor; the second conductor being electrically grounded; and
   c) the ferrite sleeve forming an inner plate of a capacitor and the second conductor forming the outer plate of said capacitor.

15. The adjustable voltage-clamping circuit of claim 13, wherein the at least one cold-cathode field emission vacuum electron tube has main current-carrying electrodes of concentric cylindrical geometry.

\* \* \* \* \*